US005931935A

United States Patent [19]

Cabrera et al.

[11] Patent Number: 5,931,935

[45] Date of Patent: Aug. 3, 1999

[54] FILE SYSTEM PRIMITIVE ALLOWING REPROCESSING OF I/O REQUESTS BY MULTIPLE DRIVERS IN A LAYERED DRIVER I/O SYSTEM

[75] Inventors: Luis Felipe Cabrera, Bellevue; Gary D. Kimura, Kirkland, both of Wash.

[73] Assignee: Microsoft Corporation, Redmond, Wash.

[21] Appl. No.: 08/862,025

[22] Filed: May 22, 1997

Related U.S. Application Data

[63] Continuation-in-part of application No. 08/839,593, Apr. 15, 1997, abandoned.

[51] Int. Cl.[6] .............................. G06F 13/32; G06F 13/00

[52] U.S. Cl. .......................... 710/260; 710/261; 710/264; 710/5

[58] Field of Search ................................ 364/280, 283.1; 395/500, 681; 707/1; 709/301; 710/56, 10, 5, 260, 264, 52, 36

[56] References Cited

U.S. PATENT DOCUMENTS

| | | | |
|---|---|---|---|
| 3,996,564 | 12/1976 | Kerrigan et al. | 710/48 |
| 4,701,848 | 10/1987 | Clyde | 364/300 |
| 5,206,951 | 4/1993 | Khoyi | 395/650 |
| 5,247,681 | 9/1993 | Janis et al. | 395/700 |
| 5,369,770 | 11/1994 | Thomason et al. | 395/725 |
| 5,412,808 | 5/1995 | Bauer | 395/600 |
| 5,519,833 | 5/1996 | Agranat et al. | 395/200.03 |
| 5,592,683 | 1/1997 | Chen et al. | 710/52 |
| 5,630,076 | 5/1997 | Saulpaugh et al. | 710/104 |
| 5,652,913 | 7/1997 | Crick et al. | 710/45 |
| 5,671,442 | 9/1997 | Feeney et al. | 710/14 |
| 5,778,168 | 7/1998 | Fuller | 714/18 |
| 5,781,797 | 9/1992 | Crick et al. | 710/10 |

OTHER PUBLICATIONS

The Open Group, CAE Specifications: Systems Management: Data Storage Management (XDSM) API, Feb. 1997.

*Primary Examiner*—Thomas C. Lee
*Assistant Examiner*—Mohamed Mashaal
*Attorney, Agent, or Firm*—Workman, Nydegger, Seeley

[57] ABSTRACT

I/O systems of computers typically utilize multiple layered drivers to process I/O requests. I/O requests are passed from one driver to another in a defined sequence with each driver performing its processing in turn. The present invention provides a system and method for interrupting the normal sequence of processing and for allowing drivers that would not normally process an I/O request to intervene and assume control for processing the I/O request. The system and method provides a flexible and extensible way to define special types of files or directories that require special processing by a particular driver. The present invention adds a "reparse point" attribute to a file or directory. The reparse point attribute preferably contains a tag which identifies a particular driver as the owner of the reparse point and a data value which can be used by the owner driver to store any information necessary or useful in processing an I/O request. When a driver encounters a reparse point attribute, processing is interrupted and the tag and value of the reparse point are extracted from the attribute. The tag and value are then passed to the next higher level driver in the layered driver system until one driver recognizes itself as the owner of the reparse point. That driver then assumes responsibility for completing the I/O request. The owner of the reparse point may process the entire I/O requests itself, or may make further use of other drivers by passing other I/O requests to the drivers.

29 Claims, 8 Drawing Sheets

FILE SYSTEM PRIMITIVE ALLOWING REPROCESSING OF I/O REQUESTS BY MULTIPLE DRIVERS IN A LAYERED DRIVER I/O SYSTEM

RELATED APPLICATIONS

This application is a continuation-in-part of U.S. application Ser. No. 08/839,593, entitled "FILE SYSTEM PRIMITIVE ALLOWING REPROCESSING OF I/O REQUESTS BY MULTIPLE DRIVERS IN A LAYERED DRIVER I/O SYSTEM," filed on Apr. 15, 1997 in the names of Luis Felipe Cabrera and Gary D. Kimura, now abandoned.

BACKGROUND OF THE INVENTION

1. The Field of the Invention

The present invention relates to systems and methods for allowing multiple drivers in an I/O system to participate in processing an I/O request. More specifically, the present invention allows one driver to interrupt the normal sequence of processing an I/O request in order to pass control to another driver for further processing of the I/O request.

2. The Prior State of the Art

A functional computer system generally consists of three fundamental components. The first component is the computer hardware. The computer hardware includes such devices as a central processing unit (CPU), system memory such as RAM or ROM, mass storage such as magnetic or optical disk storage, a keyboard or other input device, and a display or other output device. Users of computer systems generally interact with user or application programs. Such programs include the familiar word processing applications, spread sheet applications, database applications, and so forth. The final component of a modern, functional computer system is an operating system. The computer operating system performs many functions such as allowing a user to initiate execution of an application program. In addition, modern operating systems also provide an interface between an application program and the computer system hardware. Thus, while it was once commonplace for an application program to directly access computer system hardware, modern operating systems provide standardized, consistent interfaces that allow user applications to interface with or access computer hardware in a standardized manner.

In order to provide a consistent interface between a process such as a user application and a particular type of hardware device, there may be several software layers between the actual hardware and the process. For example, a process may make a call into the operating system. The operating system, in turn, may utilize the services provided by a hardware driver layer. The hardware driver layer would then interface directly with the hardware. A primary advantage of such a layered approach is that layers may be added or replaced without creating a huge impact on the remaining layers. For example, if a new hardware device is added to a system, a new driver may be added, which allows the operating system to access the hardware. All these changes may take place with minimal or no impact on existing application processes.

When drivers are used to interface with hardware devices, the trend has traditionally been to create monolithic drivers, which incorporate all functionality needed to interface an operating system with a particular hardware device. More recently, operating systems have been developed that use multiple drivers to perform various I/O tasks. Examples of this are particularly prevalent when dealing with I/O requests to disk or other mass storage.

Data is typically stored on mass storage devices in a hierarchical fashion with directories and files organized in a hierarchy resembling a tree structure. The location of any file or directory is typically specified by a file path name. The path name typically begins with a root or starting directory and names each subdirectory until the desired file or directory is reached. For example, a file called "file.dat" may be stored in directory "temp", which is a subdirectory of the root directory "root". Thus, the path name would be /root/temp/file.dat. Resolving file names in a file system is typically a multistage procedure. It generally begins with stage that decodes all of the named components that needs to be successfully identified by the file system. The procedure then continues with an iterative process of identifying, usually from left to right, the successive components in the file name. The procedure finishes with the success or failure of each of these name resolutions. Thus, in the example above, the path name would be broken down into successive components and the resolution process would identify, in turn, the root directory, the temp subdirectory, and the file file.dat.

Most UNIX systems allow several data managers to co-exist within one installation. To achieve this, the hierarchical file name space is partitioned into sub-trees of file and directory names. A dedicated data manager then administers each sub-tree. When an I/O request is made, the name resolution process resolves the name to a particular sub-tree and the I/O request may be handled by the data manager for that sub-tree. The data manager may then call the built-in UNIX file system in order to perform the actual storage and retrieval of data. Thus, the data managers act as a value added component extending the capabilities of a particular file system.

When multiple data managers exist in a UNIX I/O system, routing of the request to the proper data manager is achieved through the mechanism of "mount points." One mount point is established in the name space to represent each of the sub-trees. During the name resolution process, when a mount point is encountered, the UNIX I/O system directs the request to the appropriate data manager in charge of administering the sub-tree represented by the mount point. The appropriate data manager then continues with the name resolution process.

The standard UNIX file system also supports symbolic links. Symbolic links represents a built-in case in which the procedure for resolving a name is begun afresh using a second name. When a symbolic link is encountered, one file name is blindly substituted for another and the name resolution process is begun anew with the substituted name.

Prior art systems have thus utilized multiple data managers to manage different parts of the address space. These data managers also were able to interact with the standard file system in order to process an I/O request. The model used in prior art systems, however, was relatively deterministic and could not be extended to cover scenarios not envisioned by its designers. In other words, the interaction between a data manager and the file system is relatively fixed with each performing a defined role. Removing either the data manager or the file system and replacing them with another component to perform some other function would be difficult. Similarly, attempting to place another manager in the system to perform a function other than managing a sub-tree would also be difficult, if not impossible, using existing driver models. It would, therefore, be desirable to provide a method that allows multiple components to work together to process an I/O request where the number of components is not fixed and may be extended or modified arbitrarily to add new components handling functions not envisioned when the system was established. It would also be desirable to allow replacement of any component without causing major disruption to the remaining components.

Another problem with the prior art is that although multiple data managers are used, their participation in the name resolution process is limited to the name space over which they have control. In other words, if multiple mount points are to be identified, multiple data managers must be installed, each to handle a particular mount point. It would be desirable to allow a single data manager to manage multiple mount points or sub-trees of information.

Thus, what is needed is a mechanism to dynamically extend and reconfigure an I/O system that uses a plurality of data managers or drivers to process I/O requests. It would also be desirable to allow such reconfiguration an extension with minimal impact on the other data managers or drivers within the system.

SUMMARY AND OBJECTS OF THE INVENTION

The foregoing problems in the prior state of the art have been successfully overcome by the present invention, which is directed to a system and method for interrupting the normal sequence of processing in an I/O system and transferring control from one data manager or driver to another data manager or driver. The present invention is particularly useful in an I/O system which uses a plurality of drivers or data managers to perform various processing functions in fulfilling an I/O request.

In a system where a plurality of drivers or data managers cooperate to fill an I/O request, the drivers or data managers often have a layered relationship, with each driver performing various types of functions to process the I/O request. For example, an I/O system may comprise a file system driver layered on top of a device driver. When an I/O request is received, the file system driver may perform certain functions, such as resolving the file name and translating the file name to a particular location on the disk. The particular location on the disk may then be passed to the device driver, which locates the proper location on the disk and reads or writes the desired information. Other drivers may also be layered either above or below the file system driver. For example, it may be desirable to provide a redundant file system driver between the file system driver and the device driver. The redundant file system driver may then perform data mirroring in order to mirror data to multiple locations on a disk or in order to mirror data to multiple disks.

In the traditional layered driver models, information is passed from one layer to another with each layer performing its various tasks before passing the request on to another layer. In some instances, it is extremely useful to be able to interrupt the normal sequence of processing and to pass control for handling at least part of the I/O request to a different driver. For example, perhaps it is important to store certain files in a special location. A driver may be developed that manages access to the files stored in the special location. Thus, when the file system driver resolves the name to the special location, it would be desirable to pass control of the I/O request to the driver that handles that information, rather than passing the I/O request to the normal device driver.

The present invention allows interruption of the normal sequence of processing and transferring of the I/O request to a particular driver. The method of the present invention is dynamically extensible and a system can be configured to add or remove drivers without disrupting operation of the other drivers. To accomplish this, a new directory and file attribute is defined called a "reparse point" attribute. The reparse point attribute is additive so that individual files and directories may either be reparse points or not, depending on the status of the reparse point attribute.

A reparse point attribute preferably has both a tag and a data value. The tag is used to identify the driver that is the "owner" of the reparse point. In general, the owner of the reparse point is responsible for processing either all or part of an I/O request involving the reparse point. The data value is data stored in the reparse point by the owner. Thus, an owner may use the value of the reparse point to store any data that will be necessary or helpful to complete a particular I/O request that involves the reparse point.

In one embodiment comprising a plurality of layered drivers, when a reparse point attribute is identified by a particular driver, the driver extracts the tag and the value of the reparse point. The I/O request, along with the tag and value of the reparse point, is then passed to other drivers until one identifies itself as the owner of the reparse point. The owner then takes control and resumes processing the I/O request. The owner of a reparse point may completely process an I/O request, or may make use of other drivers in order to completely process the I/O request. The owner may also make use of other computers to completely process the I/O request.

Because each reparse point has both a tag and a value, the reparse point mechanism provides an extremely flexible structure which may be used by any number of drivers to achieve any number of functions. For example, control may be passed to a hierarchical storage manager in order to manage data that is migrated from local storage to archival storage automatically. As another example, control may be passed to a distributed file manager which manages files stored on a plurality of different disk drives. As yet another example, control may be passed to a secure file manager, which manages files stored in a secure location or stored in an encrypted format. In essence, the present invention facilitates interruption of the normal sequence of processing and transferring of control to a different driver to handle special processing needs of special types of files or directories. The mechanism provides a coherent methodology for extending the capabilities of an I/O system to cover needs as they change over time.

The present invention is broad enough to extend the capabilities of an I/O system beyond the standard I/O operations usually supported by an I/O system. A driver or manager can be developed to cause a standard I/O operation to result in actions that have nothing to do with standard I/O operations. For example, in a home automation context, reparse points can be used to achieve any number of objectives. A reparse point can be used to call the police or fire department. One possible implementation, for example, may establish a reparse point and store the phone number of the police or fire department as part of the reparse point. When the I/O system accesses the reparse point, the driver that owns the reparse point would receive processing control as described above. The owner could then retrieve the appropriate phone number, dial it through a modem or other system, and send notification, information, speech, and so forth to the entity called. The present invention can be used in any number of other situations to use a standard I/O operation to achieve a result having nothing to do with standard I/O operations.

Accordingly, it is a primary object of this invention to provide a system and method for interrupting the normal sequence of processing in an I/O system which is extensible to cover future needs. It is another object of this invention to provide a system and method for interrupting the normal sequence of processing in an I/O system and for passing control to specialized drivers in order to handle I/O requests involving special types of files or directories. It is still another object of the present invention to provide a coherent framework that allows extensibility of the file system to handle I/O requests involving special types of files or directories without disruption of existing file system structures and functions involving other types of files or directories.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawing depict only typical embodiments of the invention and are not, therefore, to be considered to be limiting of its scope, the invention will be described and explained with additional specificity and detail through the use of the accompanying drawings in which.

DETAILED DESCRIPTION OF THE PREFERRED EMBODIMENTS

The invention is described below by using diagrams to illustrate either the structure or processing of embodiments used to implement the system and method of the present invention. Using the diagrams in this manner to present the invention should not be construed as limiting of its scope. The present invention contemplates both methods and systems for interrupting the normal sequence of processing in an I/O system and for transferring control to another driver for further processing of the I/O request. Embodiments of the present invention may comprise a special purpose or general purpose computer comprising standard computer hardware such as a central processing unit (CPU) or other processing means for executing computer executable instructions, computer readable media for storing executable instructions, a display or other output means for displaying or outputting information, a keyboard or other input means for inputting information, and so forth. Since the present invention is designed to transfer control from one driver to another driver, embodiments within the scope of this invention will generally have an I/O system that uses a plurality of drivers or data managers to complete I/O requests. The present invention, however, is not otherwise constrained by the type of I/O system that runs of the computer hardware.

Embodiments within the scope of the present invention also include computer readable media having executable instructions. Such computer readable media can be any available media which can be accessed by a general purpose or special purpose computer. By way of example, and not limitation, such computer readable media can comprise RAM, ROM, EEPROM, CD-ROM or other optical disk storage, magnetic disk storage or other magnetic storage devices, or any other medium which can be used to store the desired executable instructions and which can be accessed by a general purpose or special purpose computer. Combinations of the above should also be included within the scope of computer readable media. Executable instructions comprise, for example, instructions and data which cause a general purpose computer, special purpose computer, or special purpose processing device to perform a certain function or group of functions. Finally, embodiments within the scope of the present invention comprise a computer readable medium having a plurality of data fields stored thereon that represent a data structure.

Figure 1:
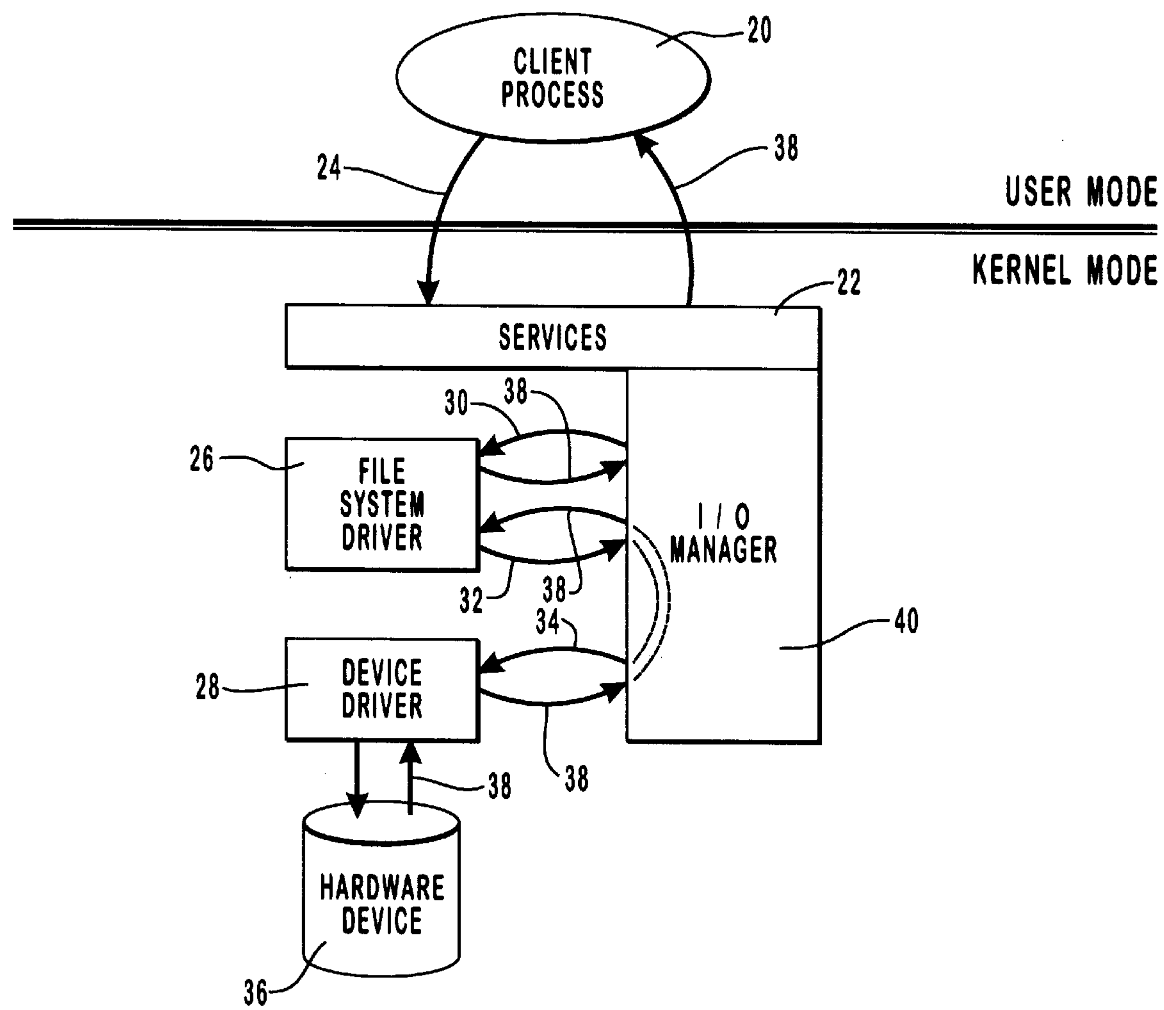
FIG. 1 is a diagram representing an I/O system employing layered drivers.

In order to more fully understand the context of the present invention, reference is now made to FIG. 1, which illustrates a simplified diagram of the interaction between a client process and an operating system having an I/O system that uses a plurality of driver means for processing I/O requests. This diagram is representative, for example, of the Microsoft Windows NT® operating system. The diagram of FIG. 1 may also represent any operating system which uses a plurality of driver means for processing I/O requests.

In FIG. 1, client process 20 makes use of operating system services 22 to perform I/O requests. This is typically achieved by client process 20, making a call to an Application Program Interface (API) function provided by the operating system. Calling the appropriate API function ultimately results in call to operating system services 22. Such a call is illustrated by arrow 24.

In FIG. 1, client process 20 is illustrated as operating in "user" mode and the operating system services are illustrated as operating in "kernel" mode. Modern operating systems typically provide a robust environment for various application programs and intuitive user interfaces. Such operating systems normally have different operating levels or "modes," depending on the level of sophistication of the operating system and the security features that are implemented by the operating system. Normal application programs typically run at the lowest priority and have a full complement of security devices in place to prohibit interference with other applications, or with other layers of the operating system. Hardware and other services provided by the operating system are only accessed through controlled interfaces or mechanisms which limit the ability of a user application or other process in the user mode to "crash" the system. This lowest priority mode is typically referred to as user mode and is the mode that most computer users are familiar with. Because of the close integration of drivers with their associated hardware and because of the time critical nature of the tasks that many drivers perform, drivers typically run in an operating system mode that has a much higher priority and much lower security protection. This mode is generally referred to "kernel" mode. Placing the drivers and other operating system services in the kernel mode allows the operating system to run at a higher priority and perform many functions that would not be possible from user mode.

When client process 20 calls operating system services 22 in order to perform an I/O request, the I/O request is passed to a first driver means for processing I/O requests. In FIG. 1, file system driver 26 and device driver 28 represent examples of driver means for processing I/O requests. The passing of the I/O request to the first driver means is illustrated in FIG. 1, for example, by arrow 30. File system driver 26 will then take the I/O request and generally perform partial processing of the I/O request before passing the I/O request onto the next driver. In the context of this patent, "I/O request" includes any type of I/O operation supported by the I/O system. Note that this may include much more than the normal file operations typically associated with an I/O system. The term may also include extended capabilities of the I/O system. Thus, the term "I/O request" should be given a broad interpretation.

As an example, suppose client process 20 wished to open a particular file on disk and retrieve information from the file. The I/O request would pass from client process 20 to operating system services 22 and onto file system driver 26. File system driver 26 would then translate the I/O request from a file name to a particular location on a disk. The translation process may also include the number of data blocks that should be read from or written to the disk at the particular location. This information can then be passed to the next driver, as for example, device driver 28. The process of passing the information required by device driver 28 is illustrated in FIG. 1 by arrows 32 and 34. Device driver 28 takes the location and number of data blocks to be read or written and translates them to the appropriate control signals to retrieve the desired information from or store the desired information to hardware device 36. The data retrieved may then be passed from device driver 28 to file system driver 26 and ultimately back to client process 20 as indicated by return arrows 38. Status information may be returned in the same manner.

In FIG. 1, I/O requests are not passed directly between file system driver 26 and device driver 28. Rather, the I/O requests are passed between the drivers via I/O manager 40. It is, however, not necessary to have an I/O manager in all implementations. Embodiments may also exist where I/O requests are passed directly from one driver to another.

One important concept to be gleaned from FIG. 1 is that when I/O requests are created by a client process, the sequence of processing in traditional systems remains relatively fixed and unaltered. In other words, an I/O request of a particular type is processed in exactly the same way every time an I/O request of that type is received. The I/O request is passed first to one driver which may perform partial processing which then forwards the I/O request to a second driver which may also perform partial processing on the I/O request. In general, this procedure is followed with each driver passing the I/O request on to a successive driver until the I/O request is ultimately processed. In prior art systems, no provision is made for interrupting the normal sequence of processing and returning control to either a previous driver or to a separate driver for the handling of special types of I/O requests.

Figure 2:
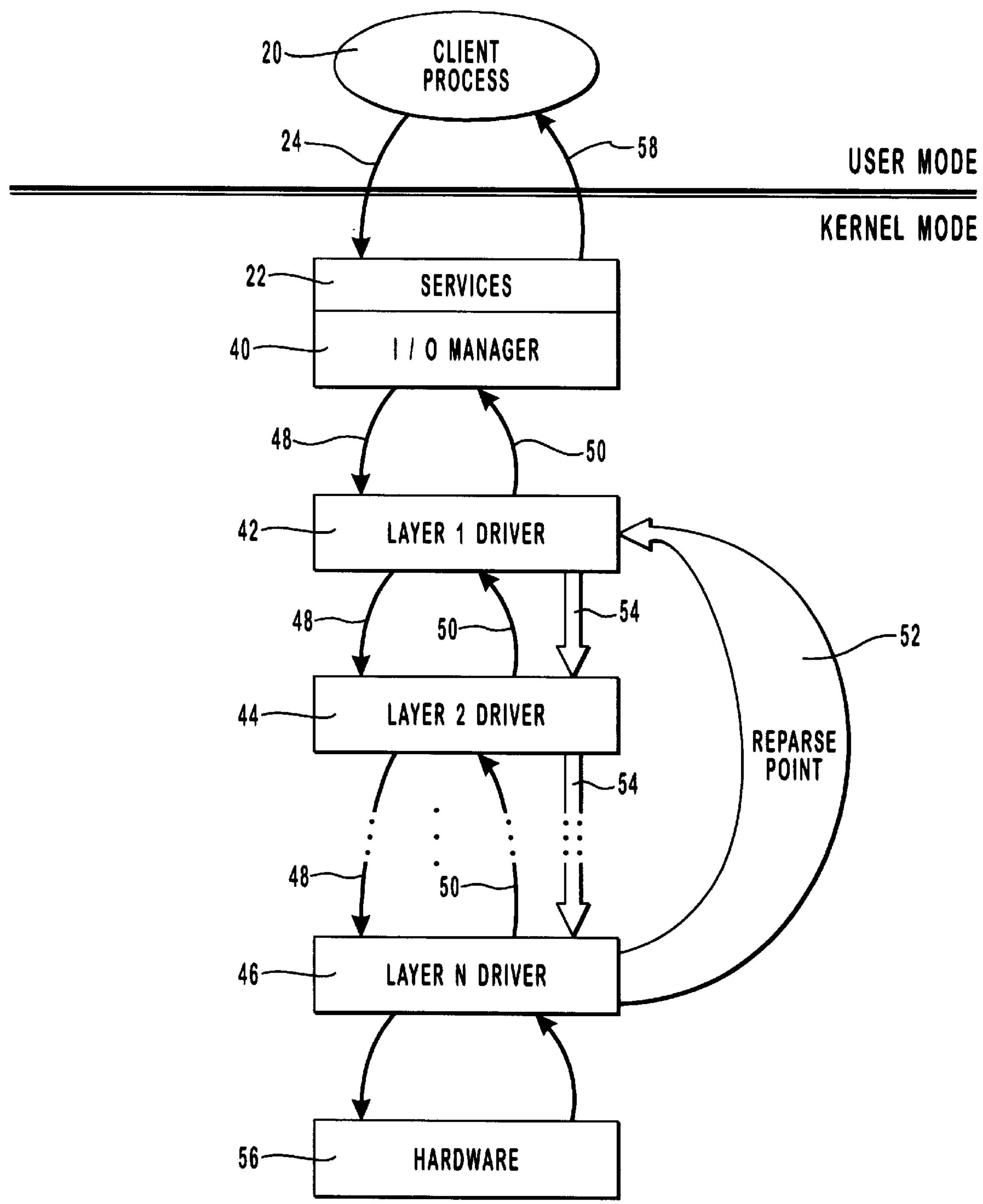
FIG. 2 is a diagram illustrating transfer of control from one layered driver to another layered driver when a reparse point attribute in encountered.

Referring next to FIG. 2, a generalized diagram of a system embodying the present invention is illustrated. Client process 20 again makes an I/O request that is eventually forwarded to operating system services 22 as illustrated by arrow 24. The I/O system of the present invention comprises a plurality of driver means for processing such I/O requests. By way of example, and not limitation, in FIG. 2, such driver means are illustrated by layer 1 driver 42, layer 2 driver 44, and layer N driver 46.

Because I/O requests are passed from one driver means to another driver means, embodiments within the scope of the present invention may comprise means for passing an I/O request from one driver to another. By way of example, in FIG. 2 such means is illustrated by arrows 48 and 50, which illustrate I/O requests being passed directly from one driver to another. Such means may also comprise an I/O manager, such as that illustrated in FIG. 1, which handles the transferring of I/O requests from one driver to another.

In FIG. 2, I/O manager 40 forwards the I/O request received from client process 20 to layer 1 driver 42. Such an I/O request may be in the form of a function or service that is called by the I/O manager or any other mechanism which transfers the appropriate information to the appropriate driver. In Microsoft Windows NT®, for example, a message driven mechanism is used to communicate between the various drivers of the I/O system. In this system, an I/O request results in the I/O manager creating an I/O request packet (IRP) and sending the IRP to the appropriate driver. As the I/O requests are processed and forwarded to other drivers, information may be added to the IRP and the IRP passed to the next driver. In certain circumstances, the IRP may be modified or "transmogrified" before being passed on to the next driver. In Microsoft Windows NT®, the I/O manager is responsible for transferring IRPs between drivers. In other systems, other mechanisms may be used. Such implementation details are considered to be design choices and not critical to this invention.

Returning now to FIG. 2, once layer 1 driver 42 has performed any required processing, the I/O request is then passed to layer 2 driver 44, which performs any required processing, and then forwards the I/O request on to the next driver. Note that although FIG. 2 illustrates each driver receiving the I/O request in turn, in some embodiments it may be desirable to skip certain drivers so that only those drivers that need to process the I/O request actually handle the I/O request.

Because the present invention provides a system and method for interrupting the normal sequence of processing and transferring control to a different driver, embodiments in the present invention may comprise means for interrupting processing of an I/O request. In FIG. 2, such a means may be incorporated, for example, into layer N driver 46. In the present invention, the normal sequence of processing is interrupted when a special type of file or directory is encountered during the processing of an I/O request. Such a special file or directory is called a "reparse point." As explained in greater detail below, a reparse point is created by including a special reparse point attribute with a file or directory. Such a special reparse point attribute may be recognized by a driver when performing its I/O request.

When the attribute is recognized, the normal sequence of processing the I/O request is suspended and steps taken to complete processing of the I/O request. The steps involve transferring control for processing the I/O request to a different driver in order to allow the driver to participate in the processing of the I/O request for the special type of file or directory. Embodiments within the scope of the present invention may thus comprise means for transferring control for processing an I/O request from one driver to another. Any mechanism which transfers control from a driver processing the I/O request to another driver when processing of the I/O request is interrupted prematurely may be utilized. In FIG. 2, such a mechanism is illustrated, for example, by arrow 52, which shows control for processing the I/O request being transferred from layer N driver 46 to layer 1 driver 42 when a reparse point is encountered during the processing of the I/O request. As explained in greater detail below, the mechanism for transferring control from one driver to another may require transferring certain information so that the driver assuming control can properly process the reparse point. Thus, embodiments may also comprise means for passing reparse point information and means for passing status information. These mechanisms are discussed in greater detail below.

Once control is transferred from layer N driver 46 to layer 1 driver 42, layer 1 driver 42 must then properly process the reparse point in order to advance the processing of the I/O request. In certain situations and embodiments, the driver assuming control when a reparse point is encountered may be able to completely process the I/O request on its own.

In such situations, once the driver has completely processed the I/O request, results and/or status information would be returned to the client process, as required. Such a result may be indicated in FIG. 2, for example, if layer 1 driver 42 returned the results of the I/O request as indicated by arrow 50 out of layer 1 driver 42. On the other hand, completely processing an I/O request once a reparse point is encountered may also require the assistance of other drivers. Thus, embodiments within the scope of this invention may comprise means for creating a second I/O request to continue the processing of the original I/O request. In FIG. 2, such a means may be incorporated, for example, into layer 1 driver 42. Layer 1 driver 42 may create a second I/O request from scratch or may, for example, transmogrify the original I/O request and transfer the I/O request to another driver. In Microsoft Windows NT®, for example, such a means may be implemented by creating a new IRP and passing the IRP to the appropriate driver. Such a means may also be implemented by transmogrifying an existing IRP and then passing the IRP to the appropriate driver. In FIG. 2, such a means is illustrated, for example, by arrow 54, which can represent the created I/O request being passed from layer 1 driver 42 to layer 2 driver 44, and ultimately to layer N driver 46. As discussed in conjunction with FIG. 7 below, completely processing an I/O request may also require processing by other computers. Thus, means for creating a second I/O request may also transfer I/O requests to other computers.

Assuming layer 1 driver 42 has processed the appropriate reparse point and created another I/O request to finish processing the original I/O request, then layer N driver 46 may receive the second I/O request and interface with hardware 56 as appropriate to complete the original I/O request. The results may then be returned, as illustrated by arrows 50 to I/O manager 40 and ultimately to client process 20 as illustrated by arrow 58.

In summary, the present invention provides a system and method for interrupting the normal sequence of processing an I/O request in order to allow a driver that would not normally participate in the processing of the I/O request to intervene in the processing of the I/O request. As explained in greater detail below, such a mechanism can be extremely useful for implementing certain special types of files or directories. The present invention uses the mechanism of a reparse point attribute associated with either a file or a directory to interrupt the normal sequence of processing and passing control for processing the reparse point to a particular driver. This driver may complete the processing of the I/O request, or may generate a secondary I/O request in order to finish processing the I/O request using other drivers. As will become more apparent in the following discussion, such a mechanism provides a coherent way to extend the capabilities of an existing I/O system to handle situations never envisioned when the I/O system was first developed. Such flexibility provides an increased capability to support advanced file and directory organizational structures as they evolve over time.

When it was originally developed, the UNIX operating system defined a new simplified view of I/O. All data that is read or written is regarded as a simple stream of bytes directed to virtual files, which are represented by file descriptors. A virtual file refers to any source or destination for I/O that is treated as if it were a file. Similarly, there is not a lot of distinction between files and directories. A directory was simply viewed as a special type of file. Modern operating systems have expanded on this basic concept where files and directories can be thought of a simply a collection of “attributes”. An attribute, at its most abstract level, is simply a data storage location. Different attributes are used to identify different properties of a file or directory or are used to hold different bits of information that allows the operating system and other processes that must deal with the file or directory to know certain information about the file or directory. For example, a file may contain a name attribute which allows processes to identify the file, and a data attribute which is the data stored in the file. A file can have any number of other attributes, such as security attributes indicating who can access the file and in what manner, a time stamp attribute, attributes that identify which directory the file is stored in, and so forth. Directories may contain similar sorts of attributes, although directories do not typically contain a data attribute where a user can store a large amount of data.

Figure 3:
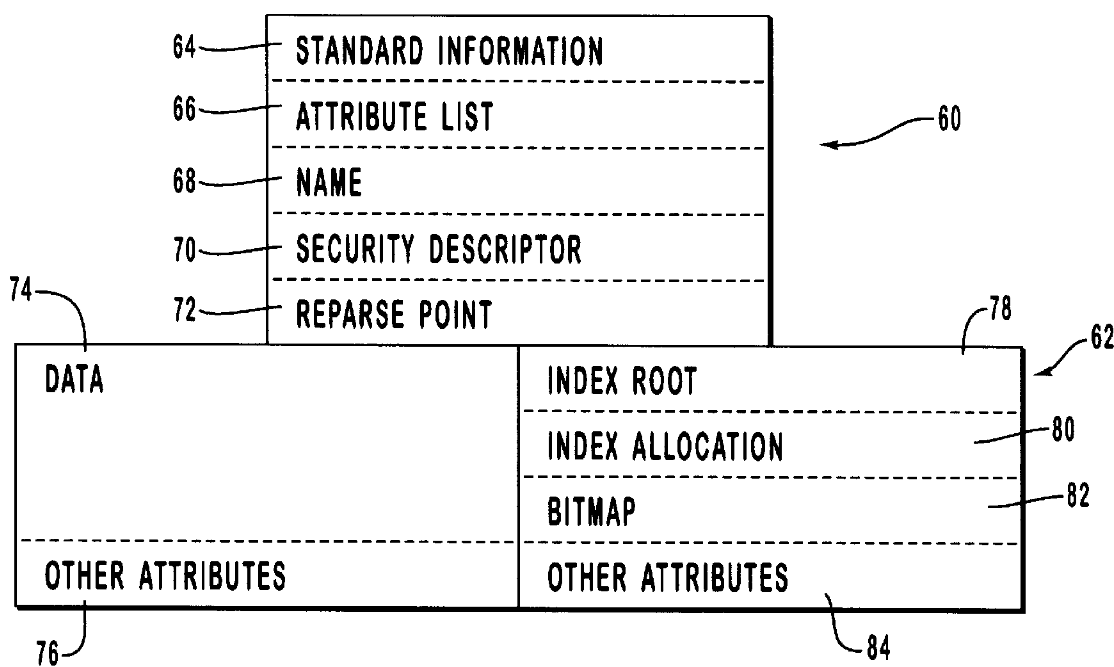
FIG. 3 is a diagram illustrating the attributes of a file or directory suitable for use with the present invention.

Referring now to FIG. 3, a pictorial diagram of attributes for either a file or a directory suitable for use with the present invention is illustrated. These attributes represent a modified list of attributes used by the NTFS file system developed specifically for Microsoft Windows NT®. The NTFS file system is described in greater detail in *Inside the Windows NT File System* by Helen Custer, published by Microsoft Press and incorporated herein by reference. In FIG. 3, the attributes that make up a file or directory may be divided into two fundamental groups. The first fundamental group, illustrated generally as 60, represents attributes that are common to both files and directories. The second fundamental group, illustrated generally 62, contains attributes specific to a file (shown on the left) or a directory (shown on the right).

Within the group of attributes common to both a file and a directory is standard information attribute 64, attribute list 66, name attribute 68, security descriptor attribute 70 and reparse point attribute 72. Standard information attribute 64 represents the standard “MS-DOS” attributes such as read-only, read/write, hidden, and so forth for a file, the time stamp of the file or directory, and how many directories point to the file. Attribute list 66 is an attribute used by NTFS to identify the locations of additional attributes that make up the file or directory should the file or directory take up more than one storage record in the master file table. The master file table is the location where all resident attributes of a file or directory are stored. Name attribute 68 is the name of the file or directory. A file or directory may have multiple name attributes in NTFS, for example, a long name, a short MS-DOS name, and so forth. Security descriptor attribute 70 contains the data structure used by Windows NT® to specify who owns the file or directory and who can access it. These attributes are described in greater detail in *Inside the Windows NT File System.*

Reparse point attribute 72 is a new attribute added by the present invention. Reparse point 72 attribute identifies a particular file or directory as a reparse point requiring special processing by a particular driver in the I/O system. The reparse point preferably contains sufficient information to allow two objectives to be achieved. The first objective is that the particular driver which should process the reparse point (the reparse point's owner) must be able to be identified. In addition, for maximum flexibility, it is preferable that the owner of the reparse point be able to store data with the reparse point that can later be used by the owner to correctly process the reparse point. In one embodiment, the reparse point attribute comprises:

| Reparse Point Flag | Tag | Data Length | Data |
|---|---|---|---|

Because a reparse point is processed by a particular driver, embodiments within the scope of this invention comprise means for identifying a particular driver as the driver that should process at least part of an I/O request involving the reparse point. Any mechanism which identifies a particular driver as the owner of a reparse point can be used for such a means. If the reparse point attribute has the structure illustrated in the table above, such a means may comprise, for example, the tag value. In the reparse point illustrated above, the tag is a data word that contains the ID of the owner of the reparse point. It is preferred that the tags be assigned in a manner so that the same tag is always associated with the same owner driver no matter which system the driver is installed on. In other words, it is preferred that some mechanism exist that assigns a tag value to a particular driver. For example, there may be a central repository or clearing house which assigns blocks of tag values to various driver manufacturers. The driver manufacturers can then assign tags to specific drivers. Any other mechanism that allows a tag value to be associated with at most a single driver can also be used. Assigning tag values in this way allows the same owner driver to process the same reparse points no matter which system it is installed on. Alternatively, in some situations it may be possible to assign local tag values in a dynamic way so that tag values are assigned by the system during installation. However, several problems exist with such a method and, for that reason, it is not generally preferred.

In the reparse point attribute illustrated in the table above, an optional reparse point flag is illustrated. The reparse point flag is illustrated above to indicate that a mechanism must exist to allow identification of files or directories that are reparse points. Such an indication may be given, for example, by using a reparse point flag which indicates a valid reparse point attribute. Alternatively, other mechanisms may also be used. For example, one or more of the tag values may be reserved to indicate that a file or directory is not a reparse point. Using such a mechanism it would be possible, for example, to reserve tag 0 to indicate that a file or a directory was not a reparse point.

The reparse point attribute illustrated above also contains an owner controlled data field. The owner controlled data field represents a location where the owner of the reparse point may place any type of data needed to properly process the reparse point. For example, if the owner deals with remote storage of various attributes of a file or directory, then when certain attributes are stored remotely, the location of the remotely stored attributes may be stored in the data field of the reparse point attribute.

In the reparse point attribute illustrated above, the data field is preceded by a data length indicator. In this storage format, the length of the data field is stored to ascertain how much data must be read to complete the data field. Alternatively, in some embodiments it may be more efficient to store a data filed of a fixed length or a data field that utilizes blocks of information chained together through pointers or links. Essentially, any mechanism that identifies how much data must be read to complete the data field can be utilized. Consideration should also be given to how much data may need to be stored by an owner driver. Such considerations will influence how the data field is stored and the maximum possible length of the data field.

Returning to FIG. 3, consideration is now given to group 62, which illustrates the differences between attributes used by a file and attributes used by a directory. A file typically has one or more data attributes, illustrated in FIG. 3 by data attribute 74. Data attribute 74 represents a location where user controlled data may be stored. This is the attribute where a user or a user process stores data. Although a user process may have access to, and store data in, other attributes, these attributes are generally understood not only by the user program, but also by other system resources, such as a driver. A driver, however, generally does not understand or deal with the data stored in the data attribute. Some file systems, such as the NTFS file system, may have more than one data attribute.

In addition to data attribute 74, a file may have other attributes, as indicated by other attributes 76. Such attributes represent any other attributes that are stored with the file. Some systems may allow user defined attributes in which case other attributes 76 may represent any number or type of attributes defined and stored by a user.

Attributes used by a directory may include, for example, index root attribute 78, index allocation attribute 80, and bit map attribute 82. Although more information regarding these attributes can be found in the *Inside the Windows NT File System* reference, previously incorporated herein by reference, essentially index root attribute 78 contains indexes to the files contained by the directory, index allocation attribute 80 contains information regarding data block or "cluster" mappings, and bit map attribute 82 keeps track of which clusters are in use and which are free. Other attributes may also be defined and stored as part of a directory, as indicated by the other attributes 84.

Although the above discussion has gone into some detail with regards to a particular type of file or directory, such should be construed as exemplary only and not as limiting the scope of this invention. The present invention will work with any type of file or directory that has a reparse point attribute added to the existing attributes of the file or directory. In the alternative, it may also be possible to co-opt or utilize an existing attribute to store the reparse point attribute information and hence, equivalently, provide a way to include a reparse point attribute without increasing the existing number of attributes in the file or directory.

Figure 4:
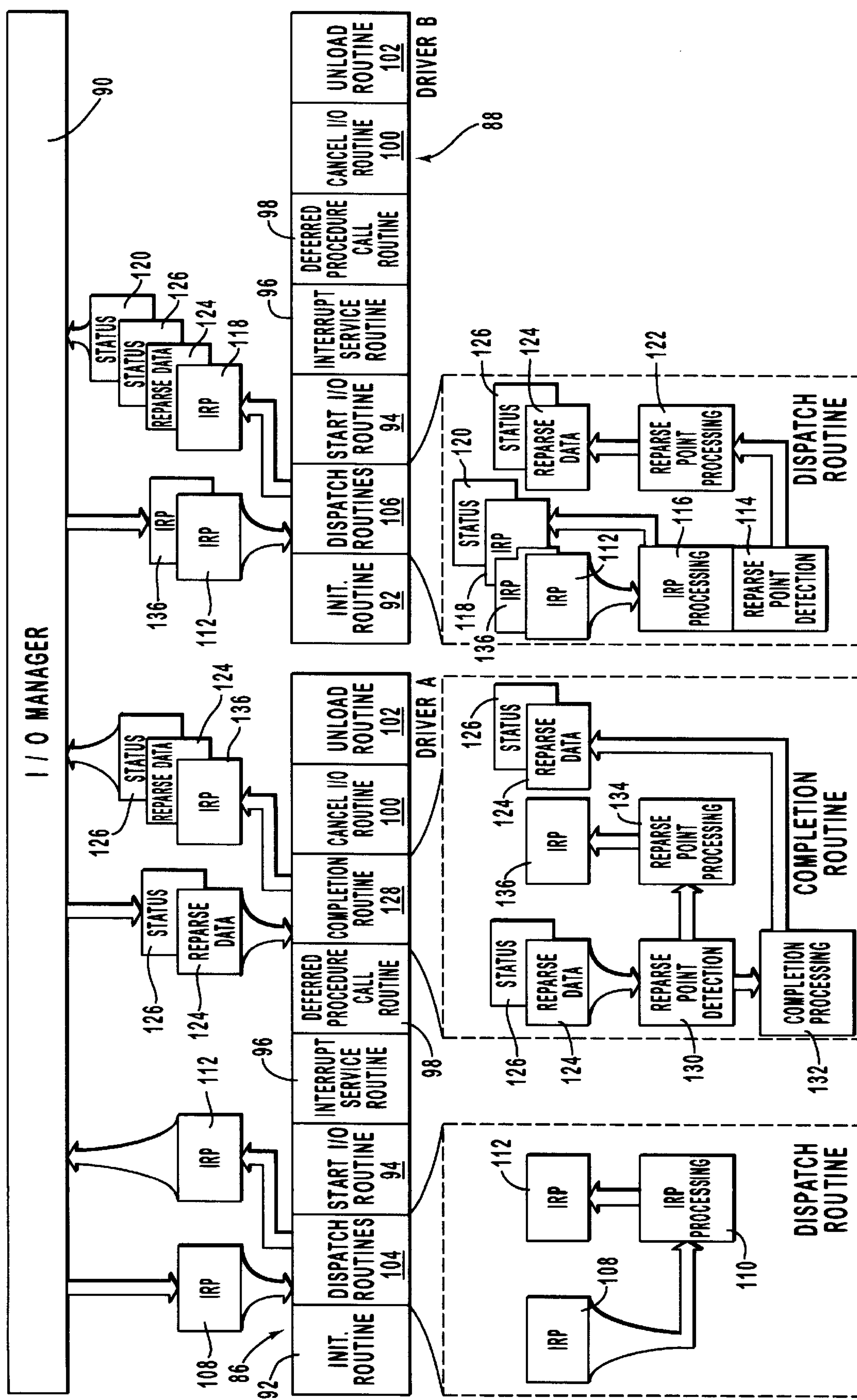
FIG. 4 is a diagram illustrating the services provided by two layered drivers and showing the general functionality incorporated into the drivers by the present invention.

Turning now to FIG. 4, a more detailed diagram of an I/O system comprising a plurality of driver means for processing I/O requests is presented. The I/O system illustrated in FIG. 4 may be an I/O system such as that utilized by Microsoft Windows NT®. Other operating systems that use a plurality of driver means for processing I/O requests may also have similar structures. The concepts discussed in conjunction with FIG. 4 may be implemented using any I/O system that comprises a plurality of driver means for processing I/O requests. Use of the structures illustrated in FIG. 4 should be considered as only one possible implementation, and should not limit the scope of the present invention.

The embodiment illustrated in FIG. 4 comprises a plurality of driver means for processing I/O requests. In FIG. 4, such driver means are illustrated, for example, by driver A shown generally as 86 and driver B shown generally as 88. Embodiments within the scope of this invention also comprise means for passing an I/O processing request from one driver to another. By way of example, and not limitation, in FIG. 4 such means is illustrated by I/O manager 90. I/O manager 90 is representative, for example, of a manager that is responsible for transferring I/O requests among the plurality of drivers used by an I/O system. As previously discussed, some embodiments may not utilize an I/O manager and may rely on direct communication between the various drivers. In such embodiments, the means for passing an I/O processing request from one driver to another would be the mechanism used by one driver to pass I/O requests directly to the other driver.

As illustrated in FIG. 4, driver A 86 and driver B 88 provide a set of services or routines that can be accessed by I/O manager 90 to accomplish various functions. The routines illustrated in FIG. 4 represent a portion of the possible routines that a driver operating under Microsoft Windows NT® may have. Details regarding the various routines can be found in Chapter 8 of *Inside Windows NT* by Helen Custer, published by Microsoft Press, the entirety of which is incorporated herein by reference.

Certain routines perform a similar function for both driver A 86 and driver B 88. Although the exact details of the routines may be very different, the overall goal of the routines is the same. Routines that perform a similar function for both driver A 86 and driver B 88 include: initialization routine 92; start I/O routine 94; interrupt service routine 96; deferred procedure call routine 98; cancel I/O routine 100; and unload routine 102. Although these routines are important to the operation of a driver under an operating system such as Microsoft Windows NT®, they are not generally important for purposes of this invention. However, the function of these routines are briefly summarized below.

Both driver A 86 and driver B 88 have an initialization routine 92. Although the initialization routines may be different for each driver, the initialization routine is executed by the I/O manager when the I/O manager loads the driver into the operating system. The routine performs whatever initialization is needed to allow the I/O manager to use and access the driver. Start I/O routine 94 is used to initiate a data transfer to or from a device. Interrupt service routine 96 is called when a device sends an interrupt for a particular driver. Under Windows NT®, processing in an interrupt service routine is kept to an absolute minimum in order to avoid blocking lower level interrupts unnecessarily. Deferred procedure call routine 98 performs most of the processing involved in handling a device interrupt after the interrupt service routine executes. Cancel I/O routine 100 is called when an I/O operation is to be cancelled. Unload routine 102 releases system resources so that the I/O manager can remove the driver from memory.

Drivers under Microsoft Windows NT® include a set of dispatch routines, such as dispatch routines 104 of driver A 86 and dispatch routines 106 of driver B 88. Dispatch routines are the main functions that a device driver provides. Some examples are read or write functions and any other capabilities the device, file system, or network the driver supports. When an I/O operation is processed by a driver, I/O manager 90 may generate an I/O Request Packet (IRP) and calls a driver through one of the driver's dispatch routines. Thus, an I/O request may be represented in FIG. 4 by IRPs passed among drivers or between the I/O manager and a driver.

When multiple drivers are used, one driver may perform partial processing of an I/O request before passing the I/O request to a subsequent driver. Such a process is illustrated in FIG. 4 by IRP 108 passed to driver A 86, partially process by driver A as indicated by IRP processing block 110, and passed to driver B 88 through IRP 112. Note that IRP 108 and IRP 112 may be the same IRP. However, for clarity in identifying how IRPs may flow between drivers, they are numbered separately in FIG. 4. It may also be possible to have an embodiment which creates a new IRP so that IRP 108 and IRP 112 are different.

When an I/O request does not involve the processing of a file or directory that has an associated reparse point attribute, a driver processes the I/O request in a normal manner and returns the information associated with the I/O request in the normal manner. For example, when IRP 112 is received by driver B 88, it can be processed in the normal manner by IRP processing block 116. During the processing of an I/O request, driver B 88 may return status information and/or an IRP to previous drivers. This is illustrated in FIG. 4 by IRP 118 and status 120. Although not illustrated in FIG. 4, IRP 118 and/or status 120 may be passed back to driver A 86 after processing by driver B 88. This is all part of the normal I/O processing and is explained in greater detail in *Inside Windows NT,* previously incorporated by reference.

When IRPs are received by drivers, the I/O request represented by the IRP may involve a file or directory that has an associated reparse point attribute. As previously explained in conjunction with FIG. 2, when an I/O request involving a file or directory with an associated reparse point attribute is encountered, normal processing of the I/O request is interrupted and control is transferred to another driver. In order to accomplish this process, embodiments within the scope of this invention comprise means for interrupting processing of an I/O request. Such means may be any mechanism by which a driver recognizes that an I/O request involves a file or directory with an associated reparse point and prematurely terminates the processing of the I/O request so that control may be transferred to another driver. In FIG. 4, such means is illustrated, for example, by reparse point detection block 114.

When reparse point detection block 114 identifies that the I/O request involves a file or directory with an associated reparse point attribute, normal processing of the I/O request is terminated and steps are undertaken to transfer responsibility for processing the I/O request to the owner of the reparse point. In FIG. 4, these steps are performed by reparse point processing block 122.

Reparse point processing block 122 performs any preprocessing necessary to transfer control from the current driver to the owner of the reparse point so that the owner of the reparse point can continue to process the I/O request. If, for example, the reparse point attribute contains a tag and a data field as previously discussed, then reparse point processing block 122 may extract the tag and data field from the reparse point attribute and prepare them for transfer to the owner of the reparse point. Thus, embodiments within the scope of this invention may comprise means for passing reparse point information to a driver. By way of example, and not limitation, in FIG. 4 such means is illustrated by reparse data 124. Reparse data 124 simply represents the reparse information extracted by reparse point processing block 122. In some embodiments it may also be possible to extract the reparse point attribute and pass it directly to the owner of the reparse point. Essentially, any mechanism that allows the owner of the reparse point to access the information stored in the reparse point attribute can be utilized as a means for passing reparse point information to a driver. This includes passing a pointer to a location where the reparse point information is stored or to the reparse point attribute itself. In one embodiment, reparse data 124 is included in an IRP and passed to another driver.

As described in greater detail below, when a driver examines reparse point information, it is preferable that the driver be able to quickly identify that a reparse point has been encountered. It may desirable, therefore, to pass status information indicating that a reparse point has been encountered. Embodiments may therefore comprise means for passing status information from one driver to another. In FIG. 4, such means is illustrated, for example, by status 126. Note that status 126 may be passed separately or may be assembled with reparse data 124 into an IRP and passed as a unit. Similarly, the status information may be placed in the IRP and a pointer or link to reparse data 124 placed in the IRP. As yet another example, status 126 may be passed and reparse data 124 may be passed in another IRP with some time delay between them.

When an I/O request involving a file or a directory with an associated reparse point is identified, responsibility for processing the I/O request is transferred from one driver to another. Embodiments within the scope of this invention therefore comprise means for transferring control for processing an I/O request from one driver to another. In the embodiment illustrated in FIG. 4, such means may comprise, for example, completion routine 128. Drivers written for the Windows NT® operating system may comprise one or more completion routines which are called by the I/O manager after a lower level driver finishes processing an IRP. For example, in an embodiment with a file system driver and a device driver, the I/O manager may call a file system driver completion routine after the device driver finishes transferring data to or from a file. The completion routine may notify the file system driver about the operation's success, failure, or cancellation, and allow the file system to perform clean-up operations. Thus, during normal processing if driver B 88 receives IRP 112, completely processes it, and returns IRP 118, I/O manager 90 may call a completion routine in block 128, which will notify driver A 86 of the success or failure of the I/O operation and allow driver A 86 to perform any clean-up processing.

Because I/O manager 90 calls a completion routine when a lower level driver has completed its processing, such a completion routine makes an ideal location to place a mechanism to detect transfer of control for processing an I/O request involving a file or directory with an associated reparse point attribute. Thus, completion routine 128 may examine reparse data 124 and/or status 126 in order to identify whether driver A 86 is the owner of the reparse point and should assume processing responsibilities of the I/O request.

However, before a driver assumes responsibility for processing an I/O request involving a file or directory with an associated reparse point attribute, the driver must ascertain whether it is the owner of the reparse point. Thus, embodiments within the scope of this invention may comprise means for identifying whether reparse point information received by a particular driver is owned by that driver. By way of example, and not limitation, in FIG. 4 such a means is illustrated by reparse point detection block 130. Reparse point detection block 130 examines reparse data 124 and/or status 126 to identify whether driver A 86 is the owner of the reparse point. If driver A 86 is not the owner of the reparse point, driver A 86 may perform any normal completion processing that is necessary, as indicated by completion processing block 132, and pass reparse data 124 and/or status 126 onto I/O manager 90 for transfer to another driver.

If, on the other hand, reparse point detection block 130 identifies driver A 86 as the owner of the reparse point, control passes to reparse point processing block 134 for further processing of the I/O request. Beyond assuming control for processing the I/O request, what happens when a driver identifies itself as the owner of a reparse point is undefined by the invention. However, in general the driver will assume responsibility for processing the I/O request and take steps to further completion of the I/O request. In some embodiments, a driver that is the owner of the reparse point may be able to completely finish processing the I/O request. In such an embodiment, after the driver has finished the processing the I/O request, the normal completion procedure is followed. In the case of Microsoft Windows NT®, this will include passing any necessary information in an IRP back to the I/O manager for further transfer. It may also include calling the completion routine of any higher level drivers in order to allow them to perform any necessary clean-up processing or in order to inform them of the status of the I/O request.

In some embodiments, the driver that is the owner of the reparse point may not be able to completely process the remainder of the I/O request by itself. In such an embodiment, reparse point processing block 134 may generate an IRP that is then passed to other drivers in order to further the processing of the I/O request. Alternatively, an I/O request can be generated and passed to another computer for further processing, as discussed in conjunction with FIG. 7. Embodiments within the scope of this invention may therefore comprise means for creating a second I/O request to continue processing of the original I/O request. Any mechanism which is utilized by the particular embodiment to enlist the help of other drivers to complete the I/O request may be utilized for such means. For example, in FIG. 4 the means for creating a second I/O request is illustrated by reparse point processing block 134 and IRP 136. IRP 136 may be passed to another driver, as for example driver B 88 of FIG. 4. Driver B 88 will then receive IRP 136 and process it as any other IRP. When reparse point processing block 134 creates IRP 136, it may create the IRP from scratch or may take an existing IRP and "transmogrify" the IRP. The process of transmogrification takes an existing IRP and changes information in the IRP to create a modified or new IRP. The means for creating a second I/O request may be implemented differently in different systems. For example, in a system where one driver directly calls another driver, the means for creating a second I/O request may be the mechanism whereby information is assembled and passed to another driver through the direct calling mechanism. Essentially, all that is required is to create or modify an I/O request that is then passed to another driver for further processing.

Figure 5:
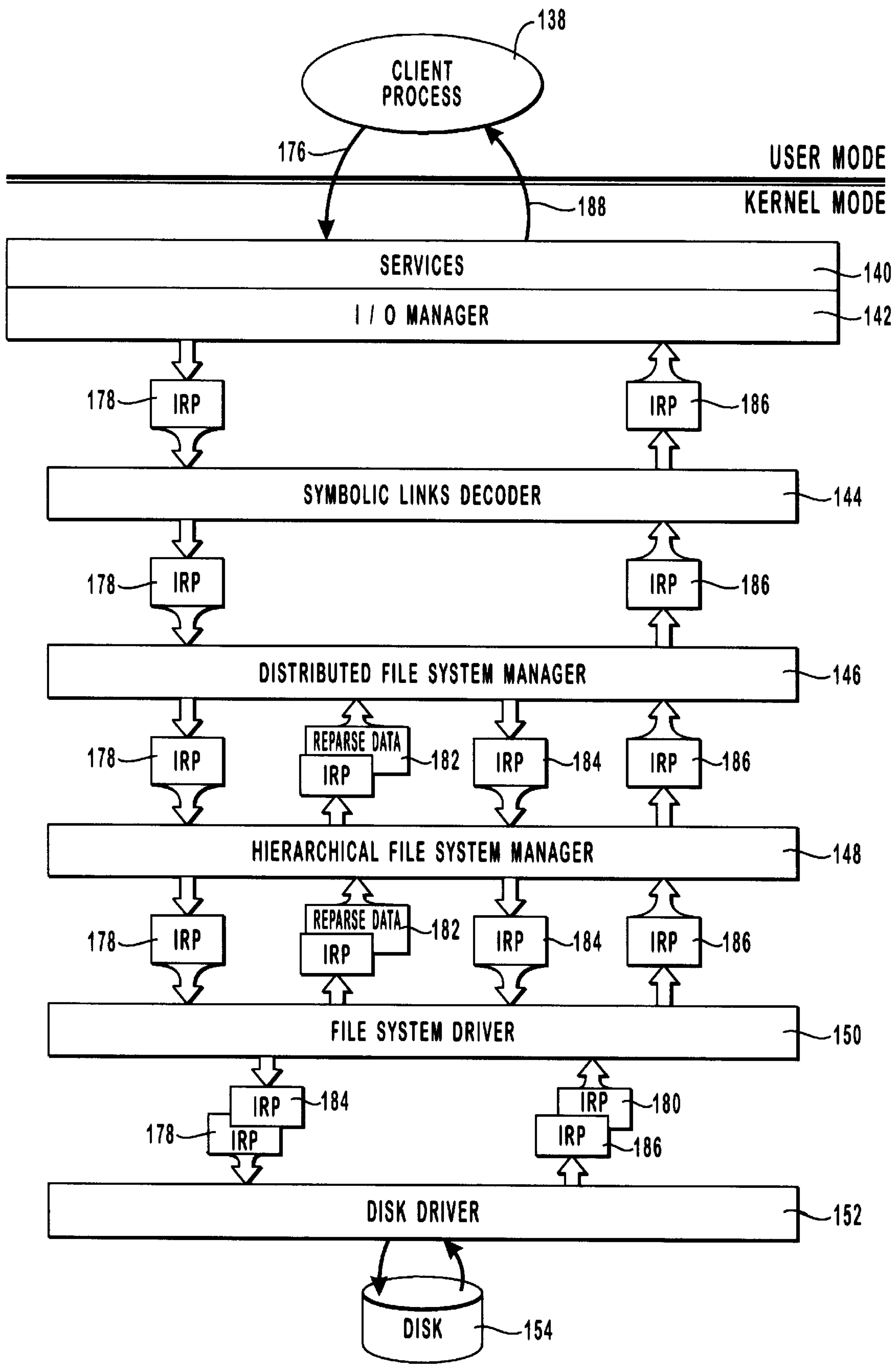
FIG. 5 is an example illustrating how the present invention may be utilized to process an I/O request involving a reparse point.
Figure 6:
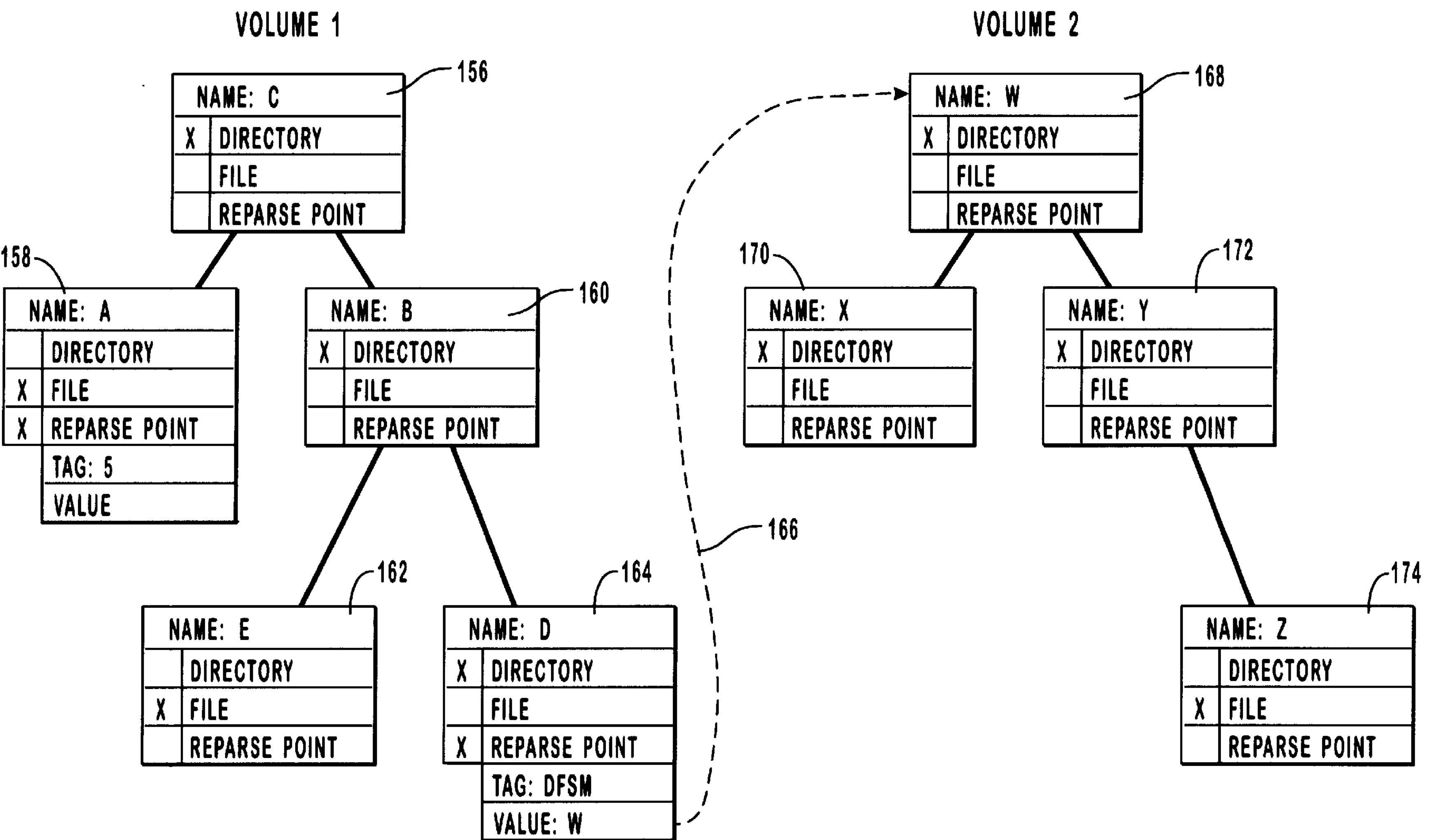
FIG. 6 is a diagram illustrating the directory structure of the example presented in FIG. 5.

In order to illustrate the above process, reference is now made to FIGS. 5 and 6, which will be used to present a specific example of processing an I/O request involving a directory with an associated reparse point attribute. Referring first to FIG. 5, the general structure of the I/O system will be discussed. In FIG. 5, client process 138 makes an I/O request to an I/O system comprising a plurality of driver means for processing I/O requests. Client process 138 makes a call to operating system services 140. I/O manager 142 receives the I/O request and coordinates the transfer of the I/O request among the various driver means of the I/O system.

In FIG. 5, a plurality of driver means for processing I/O requests are illustrated. The driver means comprise symbolic links decoder 144, distributed file manager 146, hierarchical file system manager 148, file system driver 150, and disk driver 152. Symbolic links decoder 144 is responsible for decoding any symbolic links in an I/O request. Distributed file system manager 146 manages the files distributed across several physical volumes as if they were a single integrated volume. Hierarchical file system manager 148 removes files that are accessed infrequently and stores them in a remote location such as on tape. Hierarchical file system manager 148 is also responsible for retrieving remotely stored files when they are needed. File system driver 150 is responsible for translating a request for access to a file or a directory to a physical location on a disk. Disk driver 152 is responsible for retrieving information from or placing information on disk 154. The I/O system in FIG. 5 thus uses a plurality of drivers, each responsible for a specific function or group of functions, to provide a robust I/O environment.

Turning now to FIG. 6, the logical structure of two different disk volumes is illustrated. Volume 1 has a root directory named C, illustrated in FIG. 6 as 156. Directory C contains a file named A, numbered 158, and a directory named B, numbered 160. As illustrated in FIG. 6, file A 158 is a reparse point with a tag of 5 and some data value. Directory B 160 contains a file named E 162 and a directory named D 164. As illustrated in FIG. 6, directory D 164 has an associated reparse point with a tag of DFSM and a value of W. The tag of DFSM indicates that the reparse point is owned by distributed file system manager 146. As will be illustrated in the example below, this tag and value is used to create a mount point that grafts volume 2 in at directory D. This mount point is illustrated in FIG. 6 by arrow 166. Volume 2 has a root directory named W 168. Directory W 168 contains directory X 170 and directory Y 172. Directory Y contains file Z 174.

Returning now to FIG. 5, suppose client process 138 created an I/O request involving the path name C\B\D\Y\Z. Such an I/O request may involve reading or writing data to file Z 174. The path name would be used by client process 138 to access file Z 174. Client process 138 sends this I/O request by calling services 140 as indicated by arrow 176. I/O manager 142 creates IRP 178 and passes IRP 178 to symbolic links decoder 144. As in FIG. 4, I/O manager 142 is an example of means for passing an I/O request from one driver to another.

In order to fill the I/O request initiated by client process 138, it will be necessary to resolve the file pathname C\B\D\Y\Z. In general, name resolution is a multistage process whereby the name is broken down into its constituent components and each component is resolved, usually from left to right, with success or failure being determined at each stage in the resolution process. When IRP 178 is passed to symbolic links decoder 144 it will have the pathname that needs to be resolved as part of the IRP. Depending on the exact implementation of symbolic links decoder 144, symbolic links decoder 144 may scan the pathname in IRP 178 to ascertain whether any of the constituent components of the pathname is a symbolic link. Other implementations are also possible and the exact implementation will depend upon various design considerations in the I/O system. In the example illustrated in FIG. 6, there are no symbolic links and so symbolic links decoder 144 would pass IRP 178 to distributed file manager 146. As previously discussed, in Microsoft Windows NT®, such passing of the IRP would be accomplished via I/O manager 142.

IRP 178 is received by distributed file manager 146 which, as explained above, is responsible for managing the file systems of multiple volumes and integrating them into a single, logical file system. In this example, it is presumed that distributed file manager 146 does not do much processing on IRP 178 at this stage of the resolution process. Distributed file manager 146 may, for example, simply identify the first component C as belonging to volume 1 as indicated in FIG. 6. IRP 178 is then passed to hierarchical file system manager 148. Again, it is presumed that hierarchical file system manager 148 performs little or no processing on IRP 178 before passing it to file system driver 150.

File system driver 150 then begins the name resolution process. Starting with directory C 156 of FIG. 6, file system driver 150 may translate directory C 156 into a physical location on disk 154. This information would then be placed in IRP 178 and passed to disk driver 152. Disk driver 152 would then access disk 154 and return information in IRP 180 that allowed file system driver 150 to continue the resolution process. This process may be repeated for each component of the pathname.

Referring now to FIG. 6, file system driver 150 would begin at directory C 156, proceed to directory B 160, advance to directory D 164. When directory D 164 was retrieved from the disk, file system driver 150 would recognize directory D as having an associated reparse point attribute. Means for interrupting processing of an I/O request incorporated into file system driver 150, would then interrupt the normal sequence of processing the I/O request. As explained in FIG. 4 above, file system driver 150 may extract reparse data from the reparse point attribute of directory D 164. Assuming the reparse point attribute has a tag and a data value, as previously discussed, this information would be extracted and returned to the next higher level driver. In FIG. 5, this is illustrated by reparse data 182. Reparse data 182 of FIG. 5 represents yet another example of means for passing reparse point information to a driver. In this case, the tag is database and the value is W as indicated in FIG. 6. In this example, tag DFSM identifies distributed file system manager 146 as the owner of the reparse point.

Reparse point data 182 of FIG. 5 is transferred to hierarchical file system manager 148 as illustrated. A means for identifying whether reparse point information received by hierarchical file system manager 148 is owned by that driver would then identify whether reparse data 182 is owned by hierarchical file system manager 148. Such a means may be implemented in the completion routine of hierarchical file system manager 148 as previously discussed in conjunction with FIG. 4. In this case, hierarchical file system manager 148 would not be the owner of reparse point 164 of FIG. 6. After having identified that reparse data 182 is not owned by hierarchical file system manager 148, hierarchical file system manager 148 would then forward reparse data 182 to the next higher level driver illustrated in FIG. 5.

Distributed file system manager 146 receives reparse data 182 and identifies whether reparse data 182 is owned by distributed file system manager 146. This is accomplished via means for identifying whether reparse point information received by distributed file system manager 146 is owned by that driver. Such a means may be implemented in a completion routine as previously described in conjunction with FIG. 4. In the example illustrated in FIG. 6, distributed file system manager 146 would examine reparse data 182 and recognize itself as the owner. Such may be accomplished by means for identifying a particular driver as the driver that should process at least part of the I/O request. As previously explained, an example of such means is the tag of reparse data 182. In other words, distributed file system manager 146 may recognize reparse data 182 as its own by matching the tag value of reparse data 182 with a tag value owned by itself.

When a driver recognizes reparse data as owned by itself, that driver then assumes responsibility for furthering the processing of that I/O request. In order to further process the I/O request, a driver will typically examine the data value of the reparse point attribute and use information stored therein to process the I/O request. In this case, distributed file system manager 146 stores the target of the mount point in the data value. Returning now to FIG. 6 and examining the data value of the reparse point associated with directory D 164, we find that the data value is W. This refers to directory W of volume 2. Distributed file system manager 146 can examine the data value and from that identify directory W of volume 2 as the target of the mount point. Distributed file system manager 146 may then create an IRP that continues the resolution process beginning with directory W of volume 2. In order to create a second IRP to continue the name resolution process beginning with directory W of volume 2, distributed file system manager 146 may employ means for creating a second I/O request to continue processing the original I/O request. Such a means may be implemented as previously discussed in conjunction with FIG. 4. In order to identify how the name resolution process should proceed, it would be extremely desirable for distributed file system manager 146 to be able to identify how far the name resolution process had proceeded before the reparse point was encountered. Thus, in some embodiments, it may be desirable to return the original pathname and an offset to identify how far the resolution process had proceeded before the reparse point was encountered. In this example, the pathname is C\B\D\Y\Z. The offset would then point to directory D since that is where the reparse point was encountered. In creating another IRP to continue the name resolution process, distributed file system manager 146 may choose to strip off that portion of the name that had been previously resolved and replace the reparse point D with the location where the resolution process should continue, directory W 168 of FIG. 6. In such a situation, the new pathname would be W\Y\Z. Distributed file system manager 146 may then place this information in IRP 184 and pass IRP 184 to hierarchical file system manager 148.

Hierarchical file system manager 148 would then forward IRP 184 to file system driver 150. File system driver 150 would then continue the name resolution process beginning with directory W 168 of FIG. 6. The name resolution process would then proceed through directory Y 172 until file Z 174 was reached. This process is illustrated in FIG. 5 by IRP 184 passed to disk driver 152 and IRP 186 return from disk driver 152. Note that the name resolution process may require several passes of IRP 184 and 186 between file system driver 150 and disk driver 152. Also note that IRP 186 may be the same as IRP 184 and IRP 178 may be the same as IRP 180. They are numbered differently in FIG. 5 simply to indicate that disk driver 152 may modify the IRP by placing the results of the I/O operation therein.

Once the desired I/O operation involving file Z 174 of FIG. 6 had been accomplished, and the results returned in IRP 186 to file system driver 150, file system driver 150 would then pass IRP 186 back to hierarchical file system manager 148. As illustrated in FIG. 5, IRP 186 would then be successively passed through distributed file system manager 146 and symbolic links decoder 144 until the result was ultimately returned to client process 138 as indicated by arrow 188.

Figure 7:
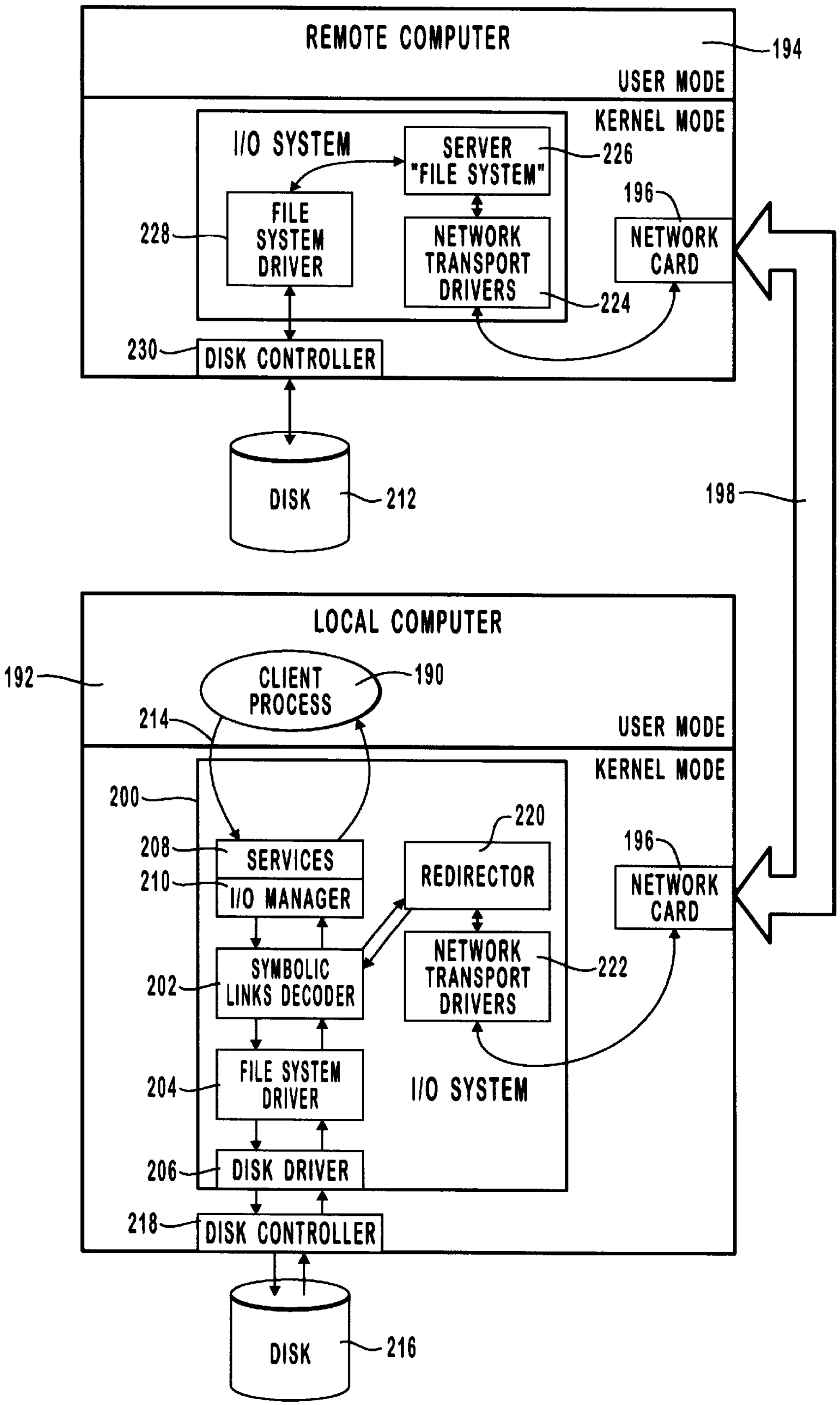
FIG. 7 is a diagram illustrating an example where another computer is used to complete an I/O request.

Referring next to FIG. 7, an example is presented where an I/O request is sent to a separate computer system for processing when a reparse point attribute is encountered. In the embodiment illustrated in FIG. 7, client process 190 is executing on local computer 192. Local computer 192 is connected to remote computer 194 via a network means for interconnecting computers. In FIG. 7, such network means is illustrated by network cards 196 and connection 198. I/O system 200 of local computer 192 comprises a plurality of driver means for processing I/O requests. In FIG. 7, such driver means is illustrated, for example, by symbolic links decoder 202, file system driver 204, and disk driver 206. I/O system 200 also comprises operating system services 208 and I/O manager 210. As in FIG. 5, client process 190 makes calls to operating system services 208. I/O manager 210 receives I/O requests and coordinates the transfer of I/O requests among the various driver means of the I/O system. Alternatively, the various driver means of the I/O system may communicate directly with each other without using an I/O manager or other device to coordinate transfer of information among the various driver means.

In this example, client process 190 is presumed to make an I/O request that involves a symbolic link which points to a file or directory located on a disk attached to remote computer 194. For example, suppose client process 190 made an I/O request to list the contents of a directory with a symbolic link to a directory located on disk 212 attached to remote computer 194. Such an I/O request would be made, for example, by client process 190 calling operating system services 208 as indicated by arrow 214. The I/O request would be passed to file system driver 204, which would utilize disk driver 206 to begin the name resolution process. Disk driver 206 will read information from disk 216 using disk controller 218. The name resolution process will continue as previously described, until the reparse point representing the symbolic link was encountered. At this point, the reparse point information would be extracted and passed to the other drivers until one recognized itself as the owner of the reparse point. In this example, symbolic links decoder 202 would recognize itself as the owner of the reparse point used to implement the symbolic link to remote computer 194.

When symbolic links decoder 202 recognizes itself as the owner of the reparse point, symbolic links decoder 202 will assume responsibility for processing the I/O request. In this example, symbolic links decoder 202 cannot fully process the I/O request by itself because processing the I/O request requires retrieving the directory information from remote computer 194. In such a situation, embodiments within the scope of this invention may comprise means for sending an I/O request to a remotely connected computer for processing. In the embodiment illustrated in FIG. 7 where local computer 192 and remote computer 194 are connected by network means, a means for sending an I/O request to the remotely connected computer can be any mechanism which transfers the I/O request to remote computer 194 via the network and allows remote computer 194 to process and fill the I/O request. For example, in FIG. 7 the means for sending an I/O request to the remotely connected computer may comprise redirector 220 and network transport drivers 222. In the embodiment illustrated in FIG. 7, redirector 220 provides the facilities necessary for local computer 192 to access resources on other machines on a network. Network transport drivers 222 provide the mechanism for transferring information from local computer 192 to remote computer 194 via network card 196 and connection 198. Other mechanisms may also be used to implement means for sending an I/O request to a remotely connected computer. In general, such means will comprise a transport mechanism to transport the I/O request from one computer to another. Such a mechanism generally may include any type of connection between two computers such as a dedicated link, a Local Area Network (LAN), Wide Area Network (WAN), phone line, wireless, and so forth. In addition, such means may also comprise a mechanism for taking the I/O request from the I/O system of one computer and delivering the I/O request to the I/O system of another computer. This may involve various types of software or firmware programs or drivers. All that is needed for such means for sending a mechanism to transport and deliver an I/O request in a format that can be processed by a remote computer.

In the embodiment of FIG. 7, when symbolic links decoder 202 realizes that an I/O request needs to be made from remote computer 194, symbolic links decoder 202 can pass the I/O request to redirector 220 which uses network transport drivers 222 to transfer the I/O request via network card 196 and connection 198 to remote computer 194. In this particular example, the I/O request would be for the directory contents of the directory pointed to by the symbolic link.

An I/O request received by remote computer 194 would be received by network transport drivers 224 and passed to server file system 226. Server file system 226 communicates with redirector 220 in order to process and fill any I/O requests sent to remote computer 194. In order to fill an I/O request, server file system 226 may utilize drivers and hardware of remote computer 194 such as file system driver 228 and disk controller 230. In the present example, server file system 226 will utilize file system driver 228 to retrieve the appropriate directory contents from disk 212 and return the directory contents to local computer 192. When the directory contents are returned, symbolic links decoder 202 may then pass the directory contents back to client process 190.

Although the embodiment illustrated in FIG. 7 contains specific components that perform communication between local computer 192 and remote computer 194, such component should be considered exemplary in all respects. All that is needed for the present invention is a mechanism whereby I/O requests are passed from a driver in the local computer to a remote computer where the I/O request is filled and appropriate information returned. Any mechanism which accomplishes these functions appropriately falls within the scope of the present invention.

Figure 8:
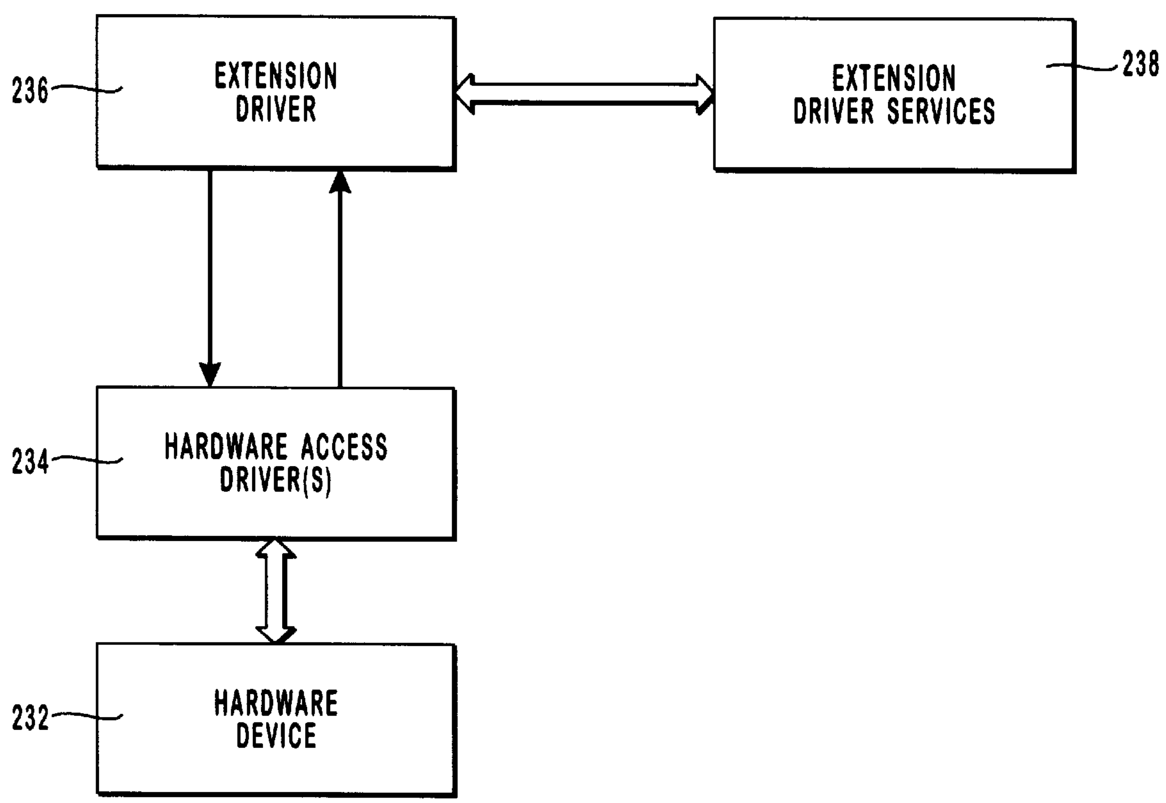
FIG. 8 is a diagram illustrating how the present invention extends the capability of an I/O system.

In order that the full breadth of the invention may be appreciated, reference is now made to FIG. 8 which presents a top-level illustration of an embodiment which uses the present invention to extend the capabilities of an I/O system. In general, an I/O system is used to send data to, or retrieve data from, a hardware device. Such a hardware device may be a mass storage device, as previously discussed, or any other type of hardware device including networks, such as that illustrated in FIG. 7, or any other device that may either be a source of data or a consumer of data. Indeed, even such devices as keyboards or displays may be controlled by portions of an I/O system, depending on the particular implementation and environment. In general, a client process sends an I/O request to an I/O system to send data to a particular hardware device or retrieve data from a particular hardware device. Additionally, the I/O system may alert a client process when information is available from a hardware device. As previously explained, an I/O request is intended to be interpreted broadly. An I/O request may thus comprise any interaction between a client process and the I/O system, including requests that send data into the I/O system or that receive data from the I/O system.

In FIG. 8, a general hardware device is illustrated by hardware device 232. As illustrated in the examples previously given, in order to access a particular hardware device, one or more drivers may be utilized by an I/O system. In FIG. 8, the drivers used to access hardware device 232 are illustrated by hardware access drivers 234. Hardware access drivers 234 are yet another example of driver means for processing I/O requests. Hardware access drivers 234 may be any number or type of drivers needed to access hardware device 232. If hardware device 232 is a disk, for example,. then hardware access drivers 234 may be one or both of either a file system driver and a disk driver. If hardware device 232 is a network device, then hardware access drivers 234 may be any number or type of drivers needed to access the network. Such a situation may occur, for example, if a mass storage device is accessed over a network.

In order to extend the capabilities of an I/O system and add additional functionality not originally included into the I/O system, one or more extension drivers may be added to process specific types of I/O requests. In FIG. 8, such specific types of drivers are illustrated by extension driver 236. Extension driver 236 is yet another example of driver means for processing I/O requests. Extension driver 236 is typically representative of a driver layer that will process reparse data in accordance with the general principles previously illustrated in the examples above. As previously explained, during normal I/O operations extension driver 236 will not be part of the processing of the I/O request. However, when a reparse point is encountered by hardware access drivers 234, control is transferred to extension driver 236 in order to allow extension driver 236 to intervene in processing the I/O request.

As previously explained, when extension driver 236 assumes control, the processing which takes place thereafter is undefined by the invention. The invention may be used to perform any type of processing. In one example, a reparse point is established in a home automation environment. When the reparse point is accessed, control is transferred to an extension driver which then takes action appropriate to the reparse point. For example, perhaps the telephone number of the fire department or police department is stored as part of the reparse point information. When an I/O request is issued involving the reparse point, control could then be transferred to a particular driver which then extracts the phone number from the reparse point and dials the police or fire department. After contact is made with the police or fire department, appropriate action can be taken, such as sending synthesized speech or other audio information in order to inform the police or fire department about a particular condition. In essence, when an I/O system encounters a reparse point, and control is transferred to a particular extension driver for processing, any actions may be taken thereafter, including actions that are not normally associated with an I/O system or with files or other information stored on storage devices.

When an extension driver, such as extension driver 236, assumes processing responsibility for an I/O request, the extension driver may perform any processing. The extension driver may, if appropriate, make use of other services or drivers to complete its task. In FIG. 8, such other drivers or services are illustrated by extension driver services 238. Extension driver services 238 can be any other drivers or services, including hardware devices, that extension driver 236 must utilize to complete its task. Obviously, such functionality may be separate or may be incorporated directly into extension driver 236, depending on the particular implementation and the design choices made for that implementation.

Finally, it should be noted that information necessary or desirable to complete processing of the I/O request can come from the reparse point, from the original I/O request, or both. The original I/O request, as well as the information in the reparse point, is available to extension driver 236.

In summary, the present invention provides a mechanism for interrupting normal processing of an I/O request and for allowing a driver that would not normally participate in the normal processing of the I/O request to assume responsibility for processing the I/O request. The method and system defined by the present invention is at once both flexible and extensible. Since the present invention does not define the exact details of processing the I/O request, but only a method for allowing intervention into the normal sequence of processing, the present invention may be utilized to achieve a wide variety of results. In essence, the mechanism allows special types of files or directories to be defined and then turn control for processing I/O requests involving the special files or directories over to a particular driver adapted for processing the I/O request involving the special file or directory. Although the use described within this patent has been to manage a distributed file system as if it were a single file system, the present invention may also be useful in managing hierarchical storage, in managing secure or encrypted files or directories, in managing new ways to access or organize files or directories other than the hierarchical fashion typically used by modern computers, or any other use that can be imagined or developed where a special type of file or directory is defined. Furthermore, once control is turned over to a driver adapted for processing the I/O request, the processing that occurs thereafter may have nothing to do with traditional I/O operations involving files or directories. The specialized driver may perform any processing using any resources, drivers, or systems appropriate to the desired task.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for interrupting the normal sequence of processing in an I/O system that uses a plurality of driver means for processing I/O requests, said plurality of driver means comprising a first driver means and a second driver means, said method comprising the steps of:

receiving, by said first driver means, an I/O request to perform a designated I/O operation; and identifying, by said first driver means, whether said I/O request requires at least partial processing by another driver means by identifying whether said I/O request involves at least one of either a file or a directory with an associated reparse point attribute;

if said at least one of either the file or the directory has an associated reparse point attribute then said first driver means performing at least the following steps:

extracting reparse point information associated with said at least one of either the file or the directory; and passing said extracted reparse point information to said second driver means for processing.

2. A method for interrupting the normal sequence of processing as recited in claim 1 further comprising the steps of:

receiving, by said second driver means, said extracted reparse point information from said first driver means; and using additional driver means to process said I/O request.

3. A method for interrupting the normal sequence of processing as recited in claim 1 wherein said plurality of driver means comprises other driver means and wherein said method further comprises the steps of:

receiving, by said second driver means, said extracted reparse point information from said first driver means; and sending, by said second driver means, an I/O request to said other driver means.

4. A method for interrupting the normal sequence of processing as recited in claim 1 wherein if said at least one of either the file or the directory has an associated a reparse point attribute then said first driver means further performs the step of sending status information to said second driver means that indicates to said second driver means that said at least one of either the file or the directory had an associated reparse point attribute.

5. A method for interrupting the normal sequence of processing as recited in claim 1 further comprising the step of passing extracted reparse point information associated with said at least one of either the file or the directory to each of said plurality of driver means, in turn, until one of said plurality of driver means identifies itself as the owner of said extracted reparse point information and takes over processing of said I/O request.

6. A method for interrupting the normal sequence of processing as recited in claim 1 wherein said extracted reparse point information comprises means for identifying said second driver means as the driver that should process at least part of said I/O request.

7. A method for interrupting the normal sequence of processing as recited in claim 1 wherein said extracted reparse point information comprises stored data used by said second driver means in processing at least part of said I/O request.

8. A method for interrupting the normal sequence of processing in an I/O system that uses a plurality of layered drivers to access hardware devices and for passing control from one of said plurality of layered drivers to another of said plurality of layered drivers, said plurality of layered drivers comprising a first driver and other drivers in a layered relationship to said first driver, said method comprising the steps of:

receiving, by said first driver, an I/O request; and identifying, by said first driver, whether said I/O request involves at least one of either a file or a directory with an associated reparse point attribute;

if said at least one of either the file or the directory has an associated reparse point attribute then said first driver performing at least the following steps:

extracting reparse point information associated with said at least one of either the file or the directory; and passing said extracted reparse point information to said other drivers.

9. A method for interrupting the normal sequence of processing as recited in claim 8 further comprising the step of examining said extracted reparse point information by each of said other drivers, in turn, until one of said other drivers recognizes that it owns said extracted reparse point information, the one of said other drivers that owns said extracted reparse point information then processing said extracted reparse point information.

10. A method for interrupting the normal sequence of processing as recited in claim 9 wherein said I/O request contains a path name including said at least one of either the file or the directory and wherein the method further comprises the step of passing information to said other drivers indicating the progress of said first driver in resolving said path name before said reparse point attribute was encountered.

11. A method for interrupting the normal sequence of processing as recited in claim 9 further comprising the step of using information from said I/O request in addition to said extracted reparse point information when processing said I/O request.

12. A method for interrupting the normal sequence of processing in an I/O system that uses a plurality of driver means for processing I/O requests, said plurality of driver means comprising a first driver means and a second driver means, said method comprising the steps of:

said first driver means receiving an I/O request involving a reparse point comprising information having a content and stored in a format that is understandable by said second driver means;

said first driver means terminating processing of said I/O request when said first driver means recognizes said I/O request involves a reparse point;

said first driver means transferring responsibility for processing said I/O request to said second driver means;

said second driver means examining said information of said reparse point and examing said I/O request in order to decide how said I/O request should be processed; and said second driver means processing said I/O request.

13. A computer-readable medium having computer-executable instructions comprising:

first driver means for processing I/O requests in an I/O system;

second driver means for processing I/O requests in said I/O system;

said second driver means comprising means for interrupting processing of an I/O request received by said second driver means before said second driver means has fully completed the processing of said I/O request; and means for transferring control for processing said I/O request from said second driver means to said first driver means in order to allow said first driver means to continue processing said I/O request; and wherein said first driver means comprises means for identifying whether reparse point information received by said first driver means is owned by said first driver means.

14. A computer-readable medium as recited in claim 13 wherein said second driver means comprises means for passing status information from said second driver means to said first driver means indicating that a reparse point attribute associated with at least one of either a file or a directory was encountered by said second driver means.

15. A computer-readable medium as recited in claim 13 wherein said second driver means comprises means for passing reparse point information associated with at least one of either a file or a directory to said first driver means.

16. A computer-readable medium as recited in claim 15 wherein said reparse point information comprises a tag and a value, said tag indicating the ID of the driver means that owns said reparse point information and said value comprising data needed by said owner to process said reparse point information.

17. A computer-readable medium as recited in claim 13 wherein said means for identifying examines a tag of said reparse point information in order to identify whether said first driver means owns said reparse point information.

18. A computer-readable medium as recited in claim 13 wherein said first driver means comprises means for creating a second I/O request to continue processing said I/O request.

19. A computer-readable medium as recited in claim 18 further comprising means for sending said second I/O request to a remotely connected computer for processing.

20. A computer-readable medium having computer-executable instructions comprising:

first driver means for processing I/O requests in an I/O system;

second driver means for processing I/O requests in said I/O system;

means for passing an I/O request from said first driver means to said second driver means;

said second driver means comprising means for interrupting processing of said I/O request by said second driver means before said second driver means has fully completed the processing of said I/O request; and means for transferring control for processing said I/O request from said second driver means to said first driver means in order to allow said first driver means to continue processing said I/O request; and wherein said second driver means comprises means for passing status information from said second driver means to said first driver means indicating that a reparse point attribute associated with at least one of either a file or a directory was encountered by said second driver means.

21. A computer-readable medium as recited in claim 20 wherein said second driver means comprises means for passing reparse point information extracted from said reparse point attribute to said first driver means.

22. A computer-readable medium as recited in claim 21 wherein said reparse point information comprises a tag and a value, said tag indicating the ID of the driver means that owns said reparse point information and said value comprising data needed by said owner to process said reparse point information.

23. A computer-readable medium as recited in claim 22 wherein said first driver means comprises means for identifying whether said reparse point information received by said first driver means is owned by said first driver means.

24. A computer-readable medium as recited in claim 23 wherein said means for identifying examines said tag of said reparse point information in order to identify whether said first driver means owns said reparse point information.

25. A computer-readable medium as recited in claim 23 wherein said first driver means comprises means for creating a second I/O request to continue processing said I/O request.

26. A computer-readable medium having computer-executable instructions forming a driver means for processing I/O requests, said driver means adapted to form part of an I/O system that uses a plurality of driver means to process I/O requests, said computer-executable instructions comprising:

means for interrupting normal processing of an I/O request received by said driver means when a reparse point attribute associated with at least one of either a file or a directory is encountered during processing of said I/O request: and means for transferring processing of said I/O request from said driver means to other of said plurality of driver means when said reparse point attribute is encountered by said driver means.

27. A computer-readable medium as recited in claim 26 wherein said computer-executable instructions comprises means for passing status information from said driver means to said other of said plurality of driver means indicating that said reparse point attribute was encountered.

28. A computer-readable medium as recited in claim 27 wherein said computer-executable instructions comprises means for passing reparse point information extracted from said reparse point attribute to said other of said plurality of driver means.

29. A computer-readable medium having a plurality of data fields stored thereon and representing a data structure, comprising:

a first set of data fields stored within a first region of a range of storage addresses allocated for storing said data structure, said first set of data fields being available to store user data and said first set of data fields being accessible by a user to retrieve data stored therein, said first set of data fields comprising:

a first data field stored within said first region containing data stored therein by said user; and a second set of data fields stored within a second region of a range of storage addresses allocated for storing said data structure, said second set of data fields being available to store various attributes of said data structure, said attributes being adapted for access by a driver means for processing I/O requests associated with said data structure, said second set of data fields comprising:

a second data field stored within said second region containing data representing the name of the data structure; and a third data field stored within said second region containing data representing a reparse point attribute adapted for use by said driver means to identify said data structure as requiring processing by other driver means.

* * * * *

UNITED STATES PATENT AND TRADEMARK OFFICE

CERTIFICATE OF CORRECTION

PATENT NO. : 5,931,935

DATED : August 3, 1999

INVENTOR(S) : Luis Felipe Cabrera, Gary D. Kimura

It is certified that error appears in the above-identified patent and that said Letters Patent is hereby corrected as shown below:

Col. 2, ln. 48: after "links" change "represents" to --represent--

Col. 5, ln. 34: after "that these" change "drawing" to --drawings--

Col. 5, ln. 44: after "attribute" change "in" to --is--

Col. 10, ln. 29: after "thought of" change "a" to --as--

Col. 15, ln. 26: after "may" and before "desirable" insert --be--

Col. 16, ln. 29: after "steps" change "to" to --towards--

Col. 22, ln. 32: after "example," delete [.]

Col. 24, ln. 41: after "associated" delete [a]

Signed and Sealed this

Thirteenth Day of June, 2000

*Attest:*

Q. TODD DICKINSON

*Attesting Officer*

*Director of Patents and Trademarks*